US009092658B2

(12) United States Patent
Bhat et al.

(10) Patent No.: US 9,092,658 B2
(45) Date of Patent: Jul. 28, 2015

(54) AUTOMATIC DETECTION OF STEREOSCOPIC CONTENT IN VIDEO/IMAGE DATA

(71) Applicant: NVIDIA Corporation, Santa Clara, CA (US)

(72) Inventors: Himanshu Jagadish Bhat, Pune (IN); Gautam Pratap Kale, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 149 days.

(21) Appl. No.: 13/869,990

(22) Filed: Apr. 25, 2013

(65) Prior Publication Data

US 2014/0321732 A1    Oct. 30, 2014

(51) Int. Cl.
  *G06K 9/00* (2006.01)
(52) U.S. Cl.
  CPC .................................. *G06K 9/00201* (2013.01)
(58) Field of Classification Search
  CPC .................. G06T 7/0075; G06T 2207/10012; H04N 13/0055; H04N 19/00769; H04N 13/0497; H04N 13/0404
  USPC ......................... 382/154; 348/43, 51, E13.075
  See application file for complete search history.

(56) References Cited

U.S. PATENT DOCUMENTS

| | | |
|---|---|---|
| 2011/0050864 A1 | 3/2011 | Bond |
| 2012/0314028 A1 | 12/2012 | Bruls |
| 2013/0027513 A1 | 1/2013 | Corral-Soto |
| 2013/0076872 A1 | 3/2013 | Wang |

FOREIGN PATENT DOCUMENTS

| | | |
|---|---|---|
| EP | 2384008 A1 | 11/2011 |
| WO | 2012130650 A2 | 10/2012 |

OTHER PUBLICATIONS http://ieeexplore.ieee.org/xpl/login.jsp?tp=&arnumber=4072035&url=http%3A%2F%2Fieeexplore.ieee.org%2Fxpls%2Fabs_all.jsp%3Farnumber%3D4072035.
http://www.nvidia.in/docs/IO/40049/TB-Quadro_VideoCaptureStreaming_v01.pdf.

*Primary Examiner* — Ruiping Li
(74) *Attorney, Agent, or Firm* — Zilka-Kotab, PC

(57) ABSTRACT

A method includes calculating, through a processor of a computing device communicatively coupled to a memory, correlation between two portions of an image and/or a video frame on either side of a reference portion thereof. The method also includes determining, through the processor, whether content of the image and/or the video frame is stereoscopic or non-stereoscopic based on the determined correlation.

9 Claims, 4 Drawing Sheets

US 9,092,658 B2

AUTOMATIC DETECTION OF STEREOSCOPIC CONTENT IN VIDEO/IMAGE DATA

FIELD OF TECHNOLOGY

This disclosure relates generally to multimedia content analysis and, more particularly, to a method, a device and/or a system of automatic detection of stereoscopic content in video/image data.

BACKGROUND

Multimedia data such as video data and/or image data may be delivered to a computing device to be rendered thereat. During the rendering, content associated with the video data and/or the image data may be rendered based on supplemental information indicating the type thereof (e.g., stereoscopic three-dimensional (stereo 3D) content). However, in many existing content delivery systems, it may not be possible to embed the supplemental information in a stream of the video data and/or the image data.

Further, it may not be easy for a user of the computing device to detect eye (e.g., left eye, right eye) priority in the video data and/or the image data without undue experimentation. While the supplemental information required can be stored in an external dedicated server, data management thereof and communication of the supplemental information may be difficult.

SUMMARY

Disclosed are a method, a device and/or a system of automatic detection of stereoscopic content in video/image data.

In one aspect, a method includes calculating, through a processor of a computing device communicatively coupled to a memory, correlation between two portions of an image and/or a video frame on either side of a reference portion thereof. The method also includes determining, through the processor, whether content of the image and/or the video frame is stereoscopic or non-stereoscopic based on the determined correlation.

In another aspect, a computing device includes a memory and a processor communicatively coupled to a memory. The processor is configured to execute instructions to correlate between two portions of an image and/or a video frame on either side of a reference portion thereof. The processor is also configured to determine whether content of the image and/or the video frame is stereoscopic or non-stereoscopic based on the determined correlation.

In yet another aspect, a non-transitory medium, readable through a computing device and including instructions embodied therein that are executable through the computing device, is disclosed. The non-transitory medium includes instructions to calculate, through a processor of the computing device communicatively coupled to a memory, correlation between two portions of an image and/or a video frame on either side of a reference portion thereof. The non-transitory medium also includes instructions to determine, through the processor, whether content of the image and/or the video frame is stereoscopic or non-stereoscopic based on the determined correlation.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device of automatic detection of stereoscopic content in video/image data. Although the present embodiments have been described with reference to specific example embodiments, it will be evident that various modifications and changes may be made to these embodiments without departing from the broader spirit and scope of the various embodiments.

Figure 1:
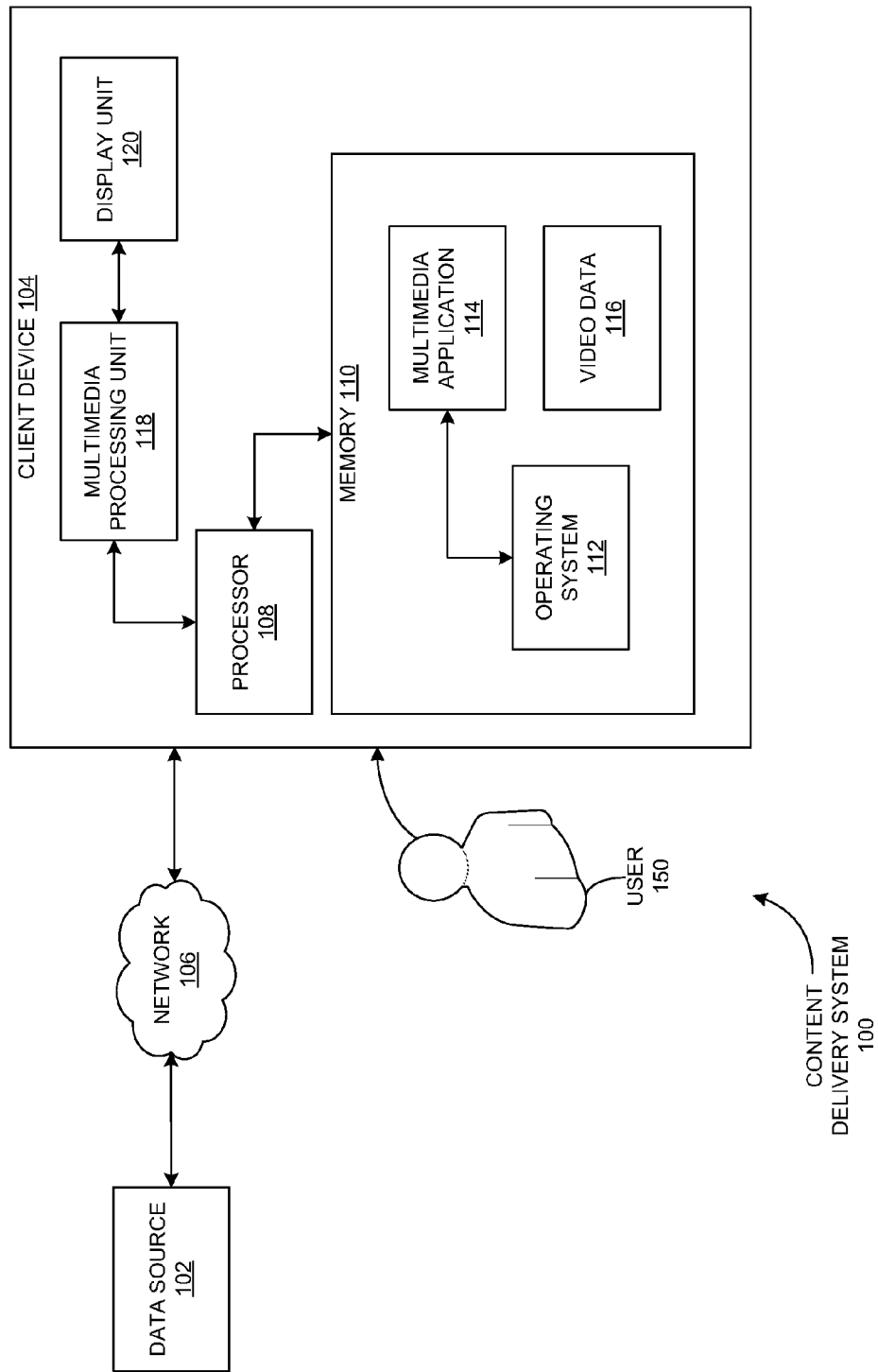
FIG. 1 is a schematic view of a content delivery system, according to one or more embodiments.

FIG. 1 shows a content delivery system 100, according to one or more embodiments. In one or more embodiments, content delivery system 100 may include a data source 102 (e.g., a server, a computing device) communicatively coupled to one or more client devices (e.g., client device 104) through a network 106 (e.g., Internet, Local Area Network (LAN), Wide Area Network (WAN)). It is obvious that a single client device 104 is merely shown as an example in FIG. 1. In one or more embodiments, data source 102 may be a server configured to generate real-time data, encode the aforementioned real-time data as video/image data and transmit the video/image data to client device 104 through network 106. For example, content delivery system 100 may be a cloud-gaming environment or a video-conferencing environment.

It should be noted video content delivery system 100 is not limited to the cloud-gaming environment or video-conferencing environment mentioned above. For example, data source 102 may also be a mere personal computer transmitting data wirelessly (e.g., through Wi-Fi®) to a tablet (an example client device 104) coupled to a television (for display purposes) through a High-Definition Multimedia Interface (HDMI) cable. Further, content delivery system 100 is not limited to data transmission through network 106. For example, concepts discussed herein may also be applicable to processing associated with files locally stored on, say, client device 104. All example data streaming systems having the capability to incorporate concepts discussed herein therein are within the scope of the exemplary embodiments.

In typical solutions, video frames/images may be received at client device 104, following which a decoder thereat decodes the video frames/images. The video frames/images may pass through conventional mono (two-dimensional (2D)) application/delivery/system framework(s). During rendering at client device 104, content of the video frames/images may be displayed in stereoscopic (stereo) three-dimensional (3D) format based on metadata (or, supplemental information) in the video/image stream associated therewith, the metadata indicating a type of stereo content and/or required user input(s) to select the type of the content. For example, stereo content may be available in different formats such as side-by-side (e.g., reduced horizontal resolution of video/image data to store the left and right eye images in each video frame/image) and top-bottom (e.g., reduced vertical resolution of the video/image data to store the left and right eye images in each video frame/image).

In typical content delivery scenarios, the abovementioned metadata may not be embedded in the video stream/image. Therefore, the only way to procure the information may be through a user input (e.g., user 150 of client device 104, another user). It may not be easy for a user to detect the stereo 3D content (or, type of the video/image content) without undue experimentation. In an alternate implementation, the abovementioned metadata/supplemental information may be stored in one or more external server(s) (e.g., dedicated servers) as property element(s) for each video/image stream. Difficulty in data management and/or unreliability in transmission of the metadata/supplemental information to the rendering pipeline (e.g., on client device 104) may be some of the issues associated therewith.

FIG. 1 shows client device 104 as including a processor 108 communicatively coupled to a memory 110. In one or more embodiments, processor 108 may be a Central Processing Unit (CPU), a Graphics Processing Unit (GPU) and/or any dedicated processor configured to execute an appropriate decoding engine thereon (decoding engine may instead be hardware); the dedicated processor may, alternately, be configured to control the appropriate decoding engine executing on another processor. All variations therein are within the scope of the exemplary embodiments. In one or more embodiments, memory 110 may be a volatile memory and/or a non-volatile memory.

It is obvious that an operating system 112 may execute on client device 104. FIG. 1 shows operating system 112 as being stored in memory 110 (e.g., non-volatile memory). In one or more embodiments, client device 100 may execute a multimedia application 114 on processor 108; multimedia application 114 may be configured to render video/image data as a stream on an interface thereon. FIG. 1 shows multimedia application 114 as being stored in memory 110 to be executed on processor 108. FIG. 1 also shows video data 116 to be streamed through multimedia application 114 as also being resident in memory 110 (e.g., volatile memory). In one or more embodiments, multimedia application 114 may utilize an Application Programming Interface (API) of a multimedia framework (to be discussed with regard to FIG. 2) in order to execute processing associated therewith.

In one or more embodiments, output data associated with processing through processor 108 may be input to a multimedia processing unit 118 configured to perform encoding/decoding associated with the data. In one or more embodiments, the output of multimedia processing unit 118 may be rendered on a display unit 120 (e.g., Liquid Crystal Display (LCD) display, Cathode Ray Tube (CRT) monitor) through a multimedia interface 122 configured to convert data to an appropriate format required by display unit 120.

Figure 2:
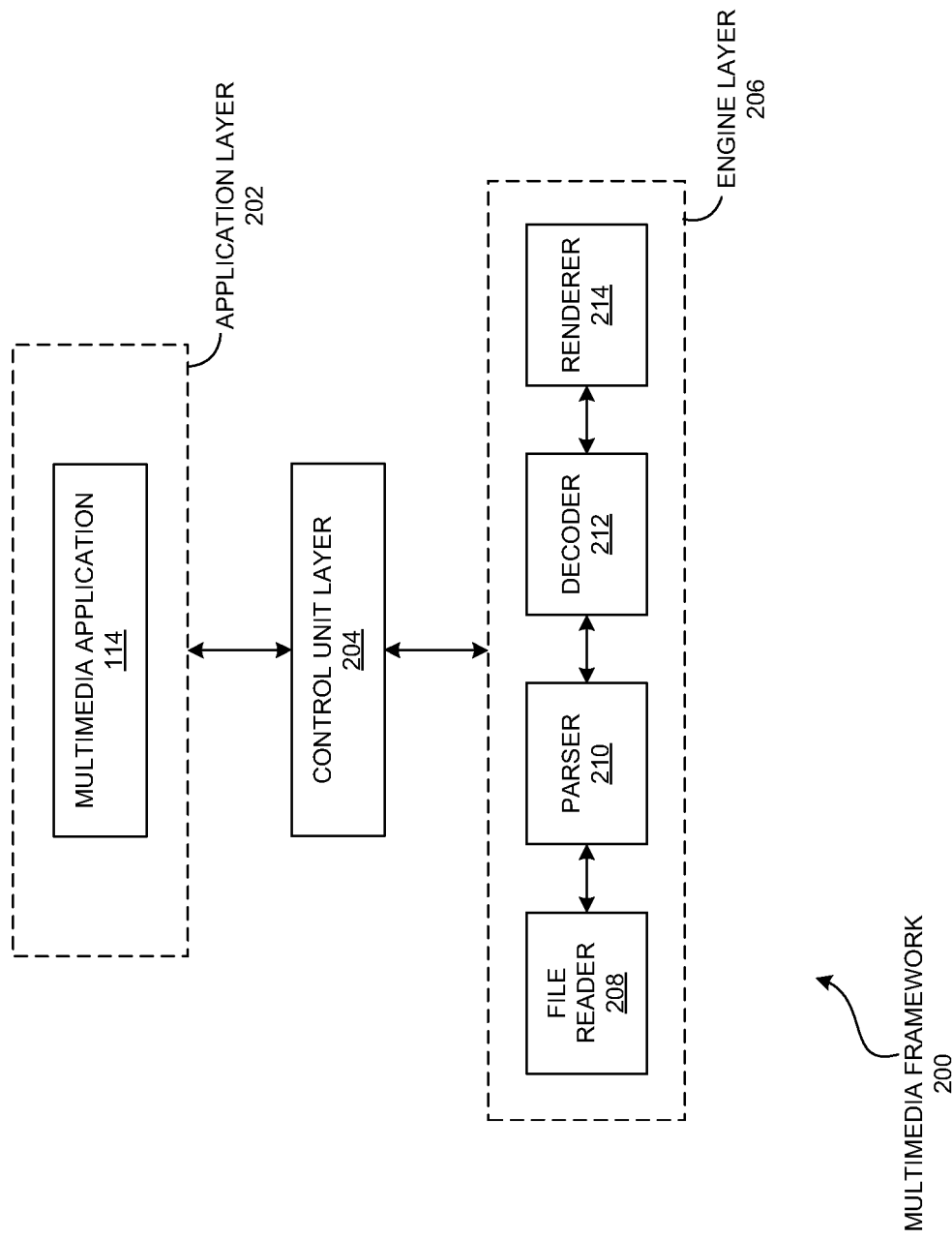
FIG. 2 is a schematic view of a multimedia framework implemented in a client device of the content delivery system of FIG. 1.

FIG. 2 shows a multimedia framework 200 implemented in client device 104, according to one or more embodiments. In one or more embodiments, multimedia framework 200 may provide multimedia capture, processing and/or playback facilities utilizing local or remote sources. In one or more embodiments, multimedia framework 200 may be above a foundation layer that facilities access of hardware such as a soundcard/display. In one or more embodiments, multimedia framework 200 may include an application layer 202 configured to communicate with a control unit layer 204 to enable performing a task required by multimedia application 114. Thus, multimedia application 114 may be at a level of application layer 202. In one or more embodiments, control unit layer 204 may control dataflow through engines (or, modules; shown as part of engine layer 206) of multimedia framework 200 such as file reader 208, parser 210, decoder 212 (e.g., hardware engine or software engine) and renderer 214.

File reader 208 may be configured to enable reading of video data 116 (obviously also applicable to image data; further discussion involving video data 116 should not be considered limiting). Parser 210 (e.g., Moving Picture Experts Group (MPEG) parser, Audio-Video Interleave (AVI) parser, H.264 parser) may parse video data 116 into constituent parts thereof. Decoder 212 may decode a compressed or an encoded version of video data 116 and renderer 214 may transmit the decoded data to a destination (e.g., a rendering device). The rendering process may also include processes such as displaying multimedia on display unit 120, playing an audio file on a soundcard, writing the data to a file etc. It is obvious that the aforementioned engines (or, modules) are merely shown for illustrative purposes and that variations therein are within the scope of the exemplary embodiments.

Figure 3:
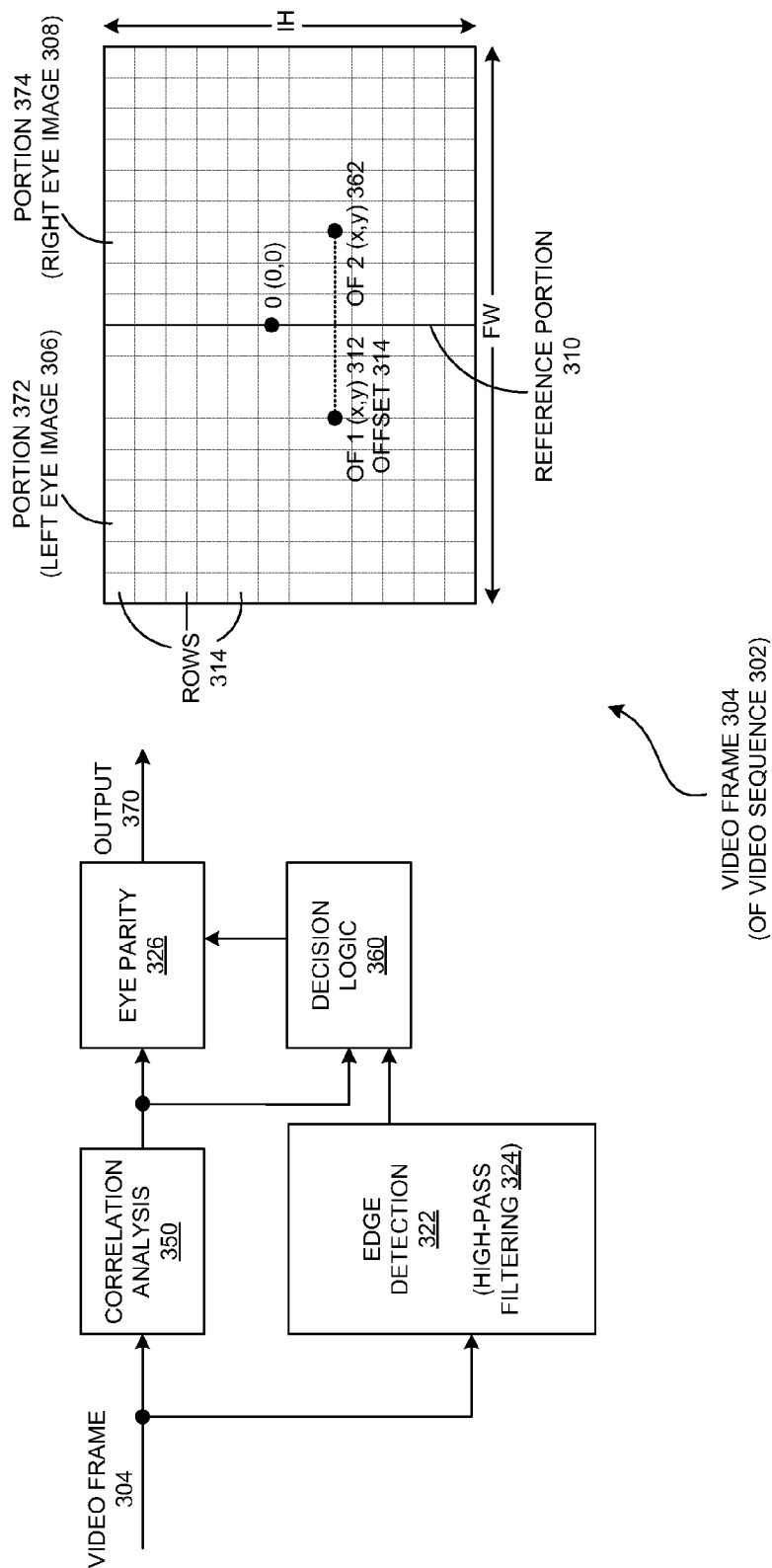
FIG. 3 is a schematic view of a providing a capability to the content delivery system of FIG. 1 to identify stereoscopic content even in the absence of metadata/supplemental information related thereto, according to one or more embodiments.

Further, it is obvious that multimedia framework 200 is merely shown for illustrative purposes, and that exemplary embodiments are not limited to implementations involving multimedia framework 200. FIG. 3 shows providing a capability to content delivery system 100 to identify stereo 3D content even in the absence of the abovementioned metadata/supplemental information, according to one or more embodiments. In one or more embodiments, the stereoscopic format detection may involve two operations that are performed independent of each other. In one or more embodiments, a video sequence 302 associated with video data 116 may be processed at client device 104 to determine a correlation between two portions (e.g., portion 372 and portion 374; these portions may be stereo images stored as side-by-side images or top-bottom images, as will be discussed below) around a reference portion 310 (O (0,0) 310; e.g., center portion, another portion) of a video frame 304 thereof. Here, in one or more embodiments, video frame 304 including a left eye image 306 and a right eye image 308 (with reference to a user such as user 150) packed together may be from a photo, video or a game source (e.g., data source 102).

In one or more embodiments, left eye image 306 and right eye image 308 may only have a slight offset therebetween in order to provide for a stereoscopic effect to the user (e.g., user 150). This implies that the correlation between left eye image 306 and right eye image 308 may be optimal at a particular offset value around reference portion 310 with respect to video frame 304. Thus, in one or more embodiments, at a particular offset (say, offset delimited by OF1 (x,y) 312 and OF2 (x,y) 362) relative to reference portion 310 of video frame 304, optimum correlation between portion 372 and portion 374 may be obtained. In one or more embodiments, the offsets (e.g., offset 312) may be calculated for each row (e.g., row 314) of video frame 304 based on correlating portion 372 and portion 374. In one or more embodiments, the calculated offsets may then be stored (e.g., in memory 110)

for all rows of video frame 304. In one or more embodiments, the average offset (e.g., AVG) may also be determined for the entire video frame 304.

In one or more embodiments, the sample variance SV of the offsets around AVG may be determined as per the pseudocode below:

```
Total = 0;
for n = 0 to n < IH,
{
Total = Total + [ABS(offset of n^th row) - ABS(AVG)]^2;
},
```

Here, IH is the image height (example dimension) of video frame 304 and ABS is the absolute value.

SV=Total/IH

In one or more embodiments, if SV is less than a threshold value derived as a factor of width of video frame 304 (FW, which is a dimension perpendicular to IH), then content of video frame 304 may be identified as stereoscopic. It is obvious then that the variance of correlation of the offsets may be disparate in the case of video frame 304 being a mono frame. Further, it is obvious that the correlation variance analysis with respect to the top-bottom format of video frame 304 is similar to the analysis discussed above with respect to the side-by-side format thereof; here, offsets may be calculated for each column of video frame 304. The processes discussed above have been shown as correlation analysis 350 in FIG. 3.

FIG. 3 also shows edge detection (e.g., edge detection 322) around a central portion (e.g., reference portion 310) of video frame 304, according to one or more embodiments. Here, in one or more embodiments, high pass filtering 324 may be performed to detect an edge around the aforementioned central portion; the edge detection may be utilized to detect stereo content of video frame 304. In one or more embodiments, in the case of video frame 304 having a plain background with objects, high pass filtering 324 may not provide for edges around the central portion. Thus, in one or more embodiments, an output of edge detection 322 may preferably be combined with the output of the correlation analysis discussed above to ensure correct detection of stereo content in video frame 304.

In one or more embodiments, correlation analysis discussed above may also yield variation of direction and position of peak amplitudes of results thereof (for example, if maxima of peak amplitudes lie on one side of video frame 304, then video frame 304 may be of Left-Right (LR) format; else, video frame 304 may be of Right-Left (RL) format). Thus, in one or more embodiments, directional distribution of peak amplitude values for each row (e.g., row 314) of video frame 304 may be calculated and utilized for determining eye parity 326 between portion 372 and portion 374. For example, it may be observed through analysis of stereo content that most streams have maximum amount of objects behind a virtual plane of zero depth and that only a small portion of objects protrude out with a "depth." This observation may be utilized along with the direction of variation of peak amplitudes to determine eye parity 326 for video frame 304.

In one or more embodiments, the output of correlation analysis 350 and/or edge detection 322 may be combined to determine whether the content of video frame 304 is stereo or mono. FIG. 3 shows the output of correlation analysis 350 AND edge detection 322 being utilized in a decision logic 360 to determine the content of video frame 304. Decision logic 360 may be implemented in hardware and/or software. In one or more embodiments, the output of correlation analysis 350 and/or decision logic 360 may provide information for determining eye parity 326. In one or more embodiments, the output of the determination of eye parity 326 may provide information regarding the stereo/mono content of video frame 304 and/or information regarding eye parity 326 as an output 370 of the entire process. As output 370 includes the metadata/supplemental information required, output 370 may be tagged to video frame 304 and/or stored in memory 110 for further analysis and/or subsequent transmission.

It should be noted that the aforementioned processes discussed with respect to the exemplary embodiments are not limited to execution thereof at client device 104. The processes may be executed at data source 102 or even a server (not shown, but obvious) separate from data source 102 and client device 104. It is further obvious that data source 102 and client device 104 may be the same computing device in an alternate implementation. Also, instructions associated with initiating the aforementioned processes may be provided as part of a driver component (e.g., a set of instructions) associated with processor 108 and/or operating system 112. Further, the aforementioned driver component and/or instructions related to the processes may be available along with an application executing on a computing device (data source 102, another server, client device 104). The instructions related to the driver component and/or the processors may also be available on a non-transitory medium (e.g., Compact Disc (CD), Digital Video Disc (DVD), Blu-ray Disc®, hard disk to which related files can be stored/downloaded) readable through the computing device. Further, the processes discussed above may not be limited to video frames; the processes may be applied to images too. All reasonable variations are within the scope of the exemplary embodiments discussed herein.

Figure 4:
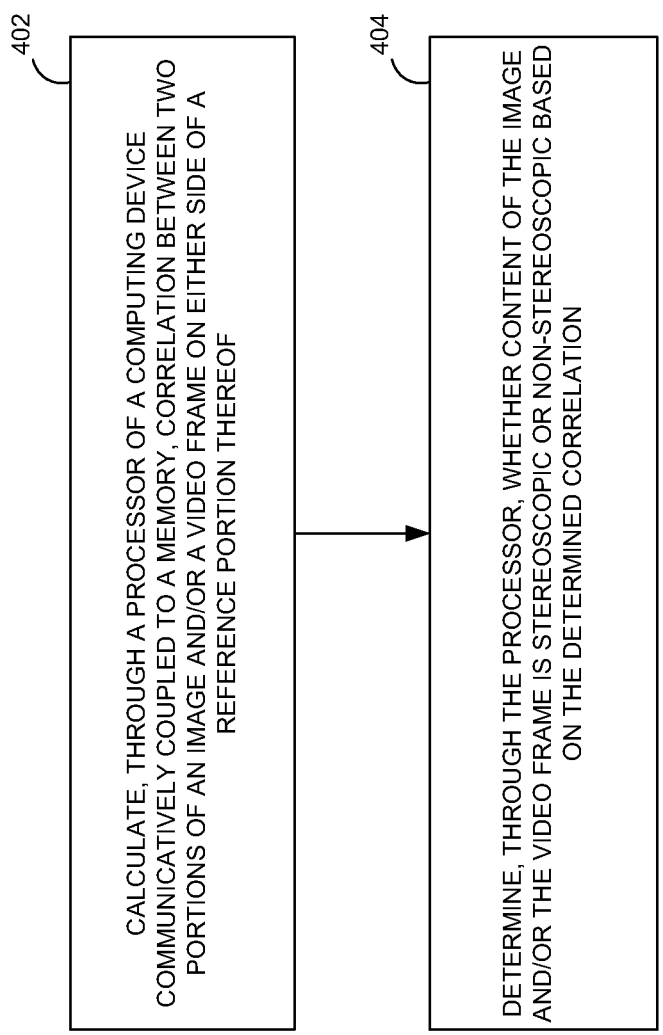
FIG. 4 is a process flow diagram detailing the operations involve in automatic detection of stereoscopic content in video/image data, according to one or more embodiments.

FIG. 4 shows a process flow diagram detailing the operations involved in automatic detection of stereoscopic content in video/image data, according to one or more embodiments. In one or more embodiments, operation 402 may involve calculating, through processor 108 of a computing device (e.g., client device 104) communicatively coupled to memory 110, correlation between two portions (e.g., portion 372 and portion 374) of an image and/or a video frame (e.g., video frame 304) on either side of reference portion 310. In one or more embodiments, operation 404 may then involve determining, through processor 108, whether content of the image and/or the video frame is stereoscopic or non-stereoscopic based on the determined correlation.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computing device). Accordingly, the specification and drawings are to be regarded in an illustrative rather than a restrictive sense.

What is claimed is:

1. A method comprising:
   calculating, utilizing a processor, a correlation between two portions of an image created by dividing the image utilizing a vertical reference edge, including determining for each of a plurality of rows of the image an offset between the two portions of the image, and calculating an average offset for the image by averaging the plurality of offsets for the plurality of rows; and
   determining whether the image is stereoscopic by calculating a sample variance of the plurality of offsets, and determining that the image is stereoscopic if the sample variance is below a predetermined threshold value.

2. The method of claim 1, further comprising detecting the vertical reference edge by performing high-pass filtering.

3. The method of claim 1, further comprising; determining a directional distribution of peak amplitude values for each of a plurality of rows of the image, and determining an eye parity between the two portions of the image, utilizing the directional distribution of the peak amplitude values.

4. A computing device comprising:
   a memory; and
   a processor communicatively coupled to the memory, the processor being configured to execute instructions for:
   calculating, utilizing a processor, a correlation between two portions of an image created by dividing the image utilizing a vertical reference edge, including determining for each of a plurality of rows of the image an offset between the two portions of the image, and calculating an average offset for the image by averaging the plurality of offsets for the plurality of rows; and
   determining whether the image is stereoscopic by calculating a sample variance of the plurality of offsets, and determining that the image is stereoscopic if the sample variance is below a predetermined threshold value.

5. A non-transitory medium, readable through a computing device and including instructions embodied therein that are executable through the computing device, comprising instructions for:
   calculating, utilizing a processor, a correlation between two portions of an image created by dividing the image utilizing a vertical reference edge, including determining for each of a plurality of rows of the image an offset between the two portions of the image, and calculating an average offset for the image by averaging the plurality of offsets for the plurality of rows; and
   determining whether the image is stereoscopic by calculating a sample variance of the plurality of offsets, and determining that the image is stereoscopic if the sample variance is below a predetermined threshold value.

6. The computing device of claim 4, further comprising detecting the vertical reference edge by performing high-pass filtering.

7. The computing device of claim 4, further comprising, determining a directional distribution of peak amplitude values for each of a plurality of rows of the image, and determining an eye parity between the two portions of the image, utilizing the directional distribution of the peak amplitude values.

8. The non-transitory medium of claim 5, further comprising detecting the vertical reference edge by performing high-pass filtering.

9. The non-transitory medium of claim 5, further comprising, determining a directional distribution of peak amplitude values for each of a plurality of rows of the image, and determining an eye parity between the two portions of the image, utilizing the directional distribution of the peak amplitude values.

* * * * *